July 29, 1958   F. ALBRECHT ET AL   2,845,591
RECTIFIER POWER SUPPLY SYSTEM
Filed July 16, 1956
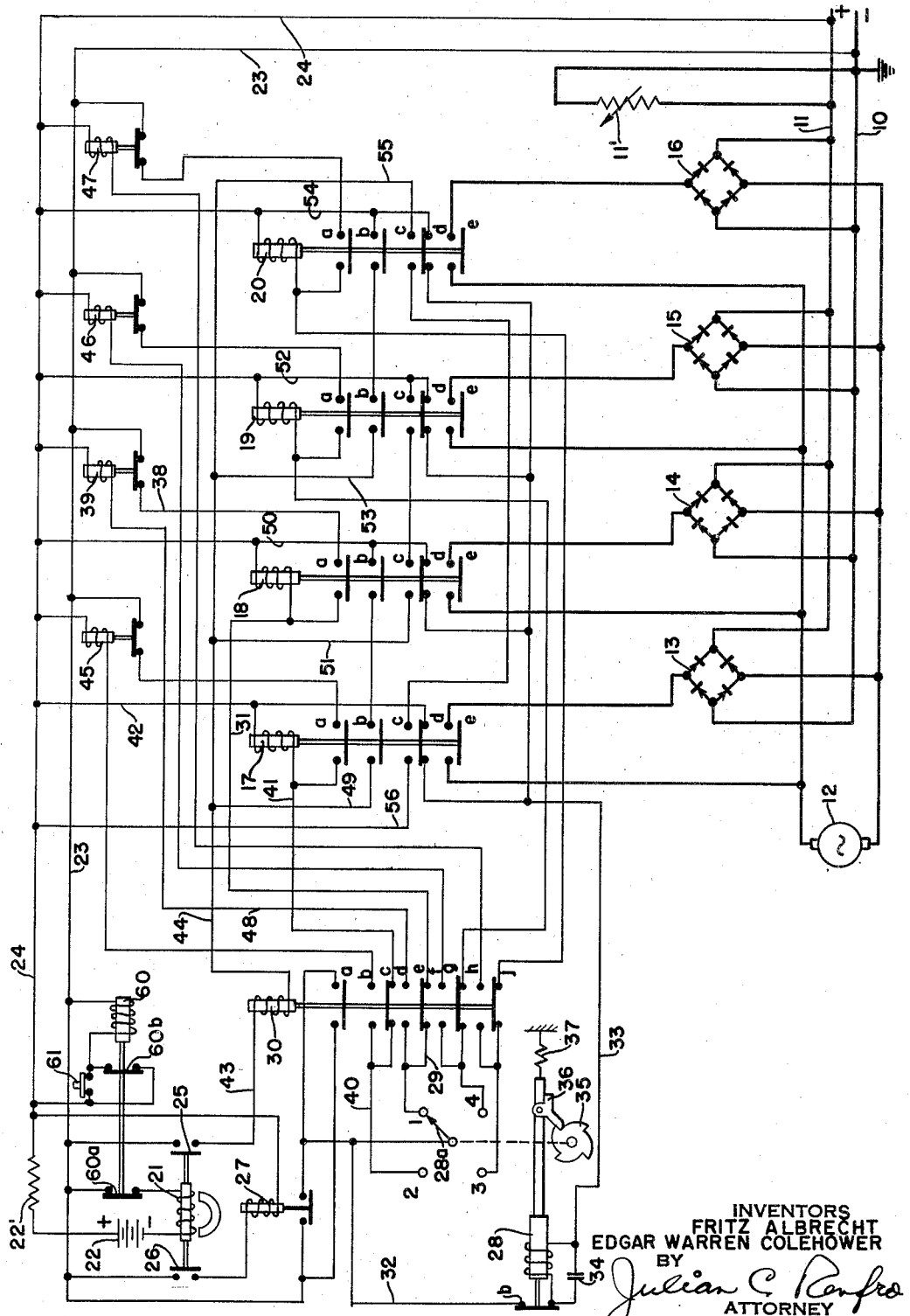
INVENTORS
FRITZ ALBRECHT
EDGAR WARREN COLEHOWER
BY
Julian C. Renfro
ATTORNEY

2,845,591

RECTIFIER POWER SUPPLY SYSTEM

Fritz Albrecht and Edgar Warren Colehower, Baltimore, Md., assignors to The Martin Company, a corporation of Maryland Application July 16, 1956, Serial No. 598,009

10 Claims. (Cl. 321—27)

The present invention relates to electrical power supply equipment, and has particular reference to an improved rectifier power supply system incorporating novel control arrangements.

In electrical systems requiring a supply of direct current (D. C.) voltage it is a common expedient to utilize an alternating current (A. C.) power source with a dry disc rectifier pack. For certain applications, such as in D. C. voltage supply systems for aircraft, it is desirable to utilize more than one rectifier unit, with the units connected in parallel circuit arrangement, so that a failure of one of the rectifier units will not result in a complete loss of voltage supply.

The use of a plurality of rectifier units connected in parallel introduces difficulties in voltage regulation and the distribution of the load among the several rectifiers. Thus, it is not uncommon that the internal resistance of the respective rectifiers will vary slightly, tending to cause unequal load distribution. And, in many cases, the resistance difference will increase with use, through aging of the rectifier elements. This is particularly true where certain of the rectifier units consistently carry a greater load than others.

Accordingly, the present invention is directed to the provision of a novel and improved rectifier power supply system for supplying direct current power to a variable load from an alternating current source of substantially constant voltage wherein the several rectifiers are utilized in such manner by means of our method of switching so as to realize optimum distribution of the load thereamong and to subject each rectifier to substantially equal use over a period of time.

The invention also seeks to provide a novel rectifier power supply system providing for the convenient and practical use of a large number of rectifier units connected in parallel circuit arrangement with the source and brought into operation when and as necessary. The arrangement is such that the individual rectifiers may be operated at or near full load, if at all, and that each rectifier is in use substantially equally as much of the time as any other. To this end, the new system includes a random selector switch which acts in response to variations in load circuit voltage to connect additional rectifiers into the load circuit, or to disconnect them, in a random manner, substantially in accordance with the voltage demands in the load circuit.

In the new system, a relatively large number of rectifiers are employed, but no more are effective at any time than is required to maintain the desired operating voltage in the load circuit. When the load circuit voltage drops below a predetermined limit, additional rectifiers are connected in the circuit, in sequence and within proper time limits, until the voltage is increased to its normal value. When the load demands are subsequently reduced, for example, rectifiers are effectively disconnected from the load circuit, one at a time, and in sequence, until the normal voltage value is again reached. The rectifiers to be added in or taken out of the load circuit are automatically selected by a random method, so that over a period of time each rectifier is subject to substantially equal use.

The above and other objects and advantages of the invention will become apparent upon consideration of the following description and accompanying drawing, in which the sole figure is a simplified schematic representation of the new system.

Referring to the drawing, the numerals 10 and 11 respectively designate negative and positive line conductors of a direct current voltage supply, leading to a variable load 11'. The conductors 10, 11 are connected to a source 12 of alternating current of substantially constant voltage, through a plurality of rectifier units 13—16 connected in parallel. The input circuits for the rectifiers 13—16 include normally open contacts 17e—20e of relays 17—20, respectively, so that the several rectifiers may be selectively and independently rendered effective in the load circuit by appropriate energization of the relays 17—20.

In the intended operation of the system, the rectifiers 13—16 will be used only when and as necessary, so that if the load 11' is small, only one of the rectifiers will be effective in the load circuit, whereas if the load is greater, a proportionately larger number of the rectifiers will be employed.

In order to render the rectifiers 13—16 effective at desired times, means are provided for operation in response to predetermined increases or decreases in the load circuit voltage of the system to add or to take out rectifiers as may be necessary. To this end, a polarized relay 21, standard voltage source 22 such as a battery, and current limiting resistor 22' are connected in series across the load circuit 10, 11 through conductors 23, 24. The standard voltage source 22 is equal to the desired load circuit voltage for the system, so that whenever the load circuit voltage drops below this value, current will flow in one direction through the conductors 23, 24, and when the load circuit voltage is higher than the standard voltage, current will flow in the opposite direction in these conductors. The polarized relay 21, which may be of standard commercial design, is provided with pairs of normally open contacts 25, 26, and is arranged so that one set of contacts will be closed in response to a predetermined flow of current in one direction through the conductors 23, 24, while the other set of contacts will be closed in response to a similar flow of current in the opposite direction.

When the load circuit voltage drops below a predetermined operating value, the armature of the polarized relay 21 will shift to the left, closing contacts 26 and completing a circuit through the energizing coil of a relay 27, which may be considered a voltage-increasing relay. When the voltage-increasing relay 27 is energized, its normally open contacts are closed, completing a first circuit to the contact member 28a of a conventional stepping relay 28. In the position shown in the drawing, which may be considered position No. 1, the contact member 28a completes a current path through conductor 29, normally closed contacts 30e of a relay 30, and conductor 31 to the energizing coil of relay 18. Thus, when the voltage-increasing relay 27 is energized, the relay 18 immediately is energized, closing its contacts 18e and rendering rectifier 14 effective in the load circuit. Of course, it is assumed that prior to this time at least one of the other rectifiers is operating in the load circuit.

To avoid discharging the battery 22, in the event of circuit failure, a normally energized relay 60 is provided, contacts 60a of which are in series with the battery 22. The energizing coil for relay 60 is connected across lines 23, 24 through contacts 60b, and when the line voltage drops below a predetermined minimum, relay 60 becomes de-energized, and contacts 60a thereof are opened to take the battery 22 out of the circuit. The relay 60 may be reset at a latter time by closing a switch 61, shunting contacts 60b.

Closing of the contacts of voltage-increasing relay 27 also completes a second circuit through conductors 32, normally closed contacts 28b of the stepping relay 28, conductor 33, and any one of the normally closed contacts 17d—20d of relays 17—20 to the energizing coil of the stepping relay 28. In parallel with this energizing coil is a capacitor 34 which charges upon the initial energization of relay 27 and thereby slightly delays the actuation of the stepping relay 28. When the capacitor 34 is sufficiently charged, the armature of the stepping relay 28 will shift to the left, and through a ratchet drive 35, 36 will cause the contact member 28a to move to a new position. As soon as the stepping relay 28 is actuated, contacts 28b thereof open, interrupting the circuit to its energizing coil. The coil is not de-energized immediately, however, due to the charge retained in capacitor 34, which is dissipated through the coil, but as soon as this charge is sufficiently reduced the armature of the stepping relay 28 is returned by a spring 37. The return movement of the armature does not alter the position of the contact member 28a, however, so that repeated actuation of the stepping relay 28 will cause the contact member 28a to move successively into new positions. In the illustrated system, the contact member will move successively into these different positions in a cyclical manner.

After the initial energization of voltage-increasing relay 27, with the contact member 28a in position No. 1, the load circuit voltage will be increased due to the addition to the circuit of rectifier 14. If this increase in voltage is sufficient to satisfy the new load demands the current flow through the polarized relay 21 will be appropriately reduced and contacts 26 thereof will be opened. This will immediately open the circuit to the contact member 28a and to the energizing coil of the stepping relay 28 so that no additional rectifiers will be placed in the supply circuit. The relay 18, however, will remain energized through a self-holding circuit including normally open contacts 18a, conductor 38 and normally closed contacts of a relay 39.

In the event that the adding to the power circuit of the rectifier 14 is not sufficient to bring the load circuit voltage up to the desired value, the contacts 26 of the polarized relay will remain closed, as will the contacts of voltage-increasing relay 27. This will permit the stepping relay 28 to be actuated to position No. 2, wherein a current path is completed through the contact member 28a, conductor 40, normally closed contacts 30c, conductor 41, the energizing coil of relay 17, and conductor 42. This places the coil of relay 17 across the power line and causes the closing of contact 17e, rendering rectifier 13 effective in the load circuit.

As will be readily understood, repetitive operation of the stepping relay 28 will continue so long as the load circuit voltage is below the desired standard, or until such time as all of the rectifiers are rendered effective in the load circuit, at which time the energizing circuit for stepping relay 28 will be interrupted due to the opening of contacts 17d—20d. Depending on the contemplated maximum load to be accommodated, and the capacity of the individual rectifier assemblies, any number of rectifiers may be employed in the system by employing a stepping relay having an appropriate number of contact positions.

When the load 11' is reduced, accompanied by an increase in the load circuit voltage, the flow of current through the polarized relay 21 will be reversed and contacts 25 of this relay will be closed. This completes a circuit through the energizing coil of relay 30, the circuit being traceable from the contacts 25 through conductors 43, 44 and any one of the normally open contacts 17b—20b. In this respect it will be understood that at least some of the relays 17—20, which may be considered adding relays, will be energized so that one or more complete circuits are provided to energize the relay 30.

When the relay 30 is energized, normally open contacts a, b, d, f, and h thereof are closed while contacts c, e, g, and j are opened. Contacts 30a, when closed, complete a current path to the contact member 28a of the stepping relay, while contacts 30b, 30d, 30f, and 30h, when closed, complete current paths from the several contact positions of the stepping relay to relays 45, 39, 46, and 47, respectively. Contacts, c, e, g, and j of the relay 30, when opened, interrupt current paths from the contact positions of the stepping relay 28 to the respective adding relays 17—20 without, however, effecting any of the adding relays which may at this time be energized, since each of the latter is provided with its own holding circuit. Thus, relay 18 has a holding circuit including normally closed contacts of relay 39, while relays 17, 19, 20 have holding circuits including normally closed contacts of relays 45—47, respectively.

When contacts 25 of the polarized relay are closed in response to an increase in voltage in the load circuit, the contact member 28a may be in any one of its four contact positions, depending upon what point in its cycle of movement the load circuit voltage was last brought within the desired range. However, to facilitate the description, it will be assumed that the contact member is in the illustrated position, or contact position No. 1.

With contact member 28a in position No. 1 and relay 30, which may be considered a voltage-reducing relay, in an energized condition, a current path is completed through contacts 30d and conductor 48 to the energizing coil of cut-out relay 39. The cut-out relay 39 becomes energized at this time, opening its contacts and thereby interrupting the holding circuit for adding relay 18. The relay 18 is thereby de-energized, opening contacts 18e to disconnect the rectifier 14 from the A. C. source and render it ineffective in the load circuit.

Closing of contact 30a of the voltage-reducing relay 30 also completes the energizing circuit for stepping relay 28 and causes the latter to be actuated in a repetitive manner, substantially as before described. This will cause the contact member 28a to be moved progressively into its contact positions to sequentially energize the cut-out relays 46, 47, 45 thereby de-energizing the associated adding relays and rendering the respective rectifiers ineffective in the load circuit. If at any time, after a rectifier is taken out of the load circuit, the load circuit voltage drops within the desired range, the polarized relay 21 will become de-energized, opening contacts 25 and de-energizing the voltage-reducing relay 30, so that the balanced conditions of the load circuit are maintained.

In order to avoid rendering all of the rectifiers 13—16 ineffective at any time, as when the load becomes so small that a single rectifier is more than adequate to maintain the desired voltage, the energizing circuit for the voltage-reducing relay 30 includes a plurality of parallel paths each connected to the conductor 44 and each including, in series, normally open contacts of a pair of the adding relays 17—20. Thus, one of the parallel paths comprises conductor 49, normally open contacts 17b and 18b, and conductor 50. A second path comprises conductor 51, normally open contacts 18c and 19c, and conductor 52. A third path comprises conductor 53, normally open contacts 19b and 20b, and conductor 54. And a fourth path comprises conductor 55, normally open contacts 20c and 17c, and conductor 56. It will thus be apparent that the energizing circuit for voltage-reducing relay 30 includes at least one parallel path for each rectifier of the system, and that each path includes normally open contacts of a pair of adding relays arranged in such combination that de-energization of any three of the adding relays 17—20 will open the energizing circuit of the voltage-reducing relay 30 to prevent the last rectifier from being rendered ineffective in the load circuit. It will be obvious, of course, that the same arrangement may be employed regardless of the number of rectifiers employed in the load circuit.

To summarize the operation of the new system, the polarized relay 21 is energized in response to an increase in the load circuit voltage, for example, to energize the voltage-increasing relay 27 and the stepping relay 28. As long as the load voltage remains below the desired range, the stepping relay 28 will move its contact member 28a successively to new positions, and each time the contact member moves into a new position an additional rectifier is connected to the A. C. source and rendered effective in the load circuit to increase the load voltage. When the desired voltage is reached, further operation of the stepping relay 28 is discontinued and the contact member thereof remains in its last position. At a subsequent time, when the load circuit voltage becomes too high, for example, the polarized relay 21 closes its contacts 25 to energize the voltage-reducing relay 30. The stepping relay 28 is again operated, starting with the contact member in the position into which it was last moved, and moving it successively into new positions to render the rectifiers 13—16 ineffective in the load circuit, one at a time, until the desired voltage is reached, or until all but one of the rectifiers is rendered ineffective.

Perhaps the outstanding advantage of the new circuit resides in the random manner in which the rectifiers 13—16 are selectively rendered effective and ineffective in the load circuit. Thus, while the contact member 28a of the stepping relay moves in a cyclical manner, the number of positions into which it will be moved in effecting a correction will vary depending on the magnitude of the load circuit voltage deviation. Therefore, in effect, the selection of the rectifiers to be rendered effective or ineffective is a random one, and over an extended period of time all of the rectifiers will be employed a substantially equal amount of time in the circuit.

One of the most important applications of the new circuit is in direct current constant voltage electrical systems of aircraft, wherein it is desirable, for safety purposes, to employ a rectifier power system incorporating a number of rectifier units so that failure of any one of the units will not totally interrupt the power service. If one or more rectifier units of the new system become ineffective, the stepping relay will continue to advance until the required voltage conditions are satisfied.

With the new arrangement it is possible to provide a substantially constant voltage to a circuit having a variable load using a large number of independent rectifier units and operating the units at or near full capacity, with each of the units being in use a proportionate amount of the time. This is a highly desirable condition, since aging of the rectifiers is kept at a minimum where the same are operated at or near capacity, and unbalanced circuit conditions due to unequal aging of the rectifiers are avoided by insuring that none of the rectifiers is used a substantially greater part of the time than any other.

It should be understood that the specific circuit herein shown and described is intended to be illustrative only. Thus, for example, while the illustrated and described circuit is incorporated in a single phase, untransformed bridge rectifier system, the invention is equally applicable to multiphase, transformer and/or rectifier systems. Reference should therefore be made to the following claims in determining the full scope of the invention.

We claim:

1. A rectifier power supply system comprising an alternating current source of substantially constant voltage, a plurality of rectifiers, each of which is adapted to supply a direct current voltage when connected to said alternating current source, an input circuit including said source and each of said rectifiers connected in parallel relation with said source, a load circuit adapted to be operated at a predetermined voltage value, a plurality of switching devices, one for each of said rectifiers, each of said switching devices adapted to connect a rectifier to said load circuit, means responsive to variations in the said voltage of said load circuit for actuating said switching devices in a random manner whereby each of said rectifiers is connected in the load circuit a substantially equal number of times during any substantial period of operation.

2. The power supply system of claim 1, further characterized by the means for actuating the switching devices comprising a sequencing element for actuating the switching devices, in sequence in accordance with a cycle.

3. The power supply system of claim 2, further characterized by the sequencing element comprising a cyclicly operable stepping relay having a separate contact for each rectifier and adapted upon each energization to actuate a switching device.

4. A rectifier power supply system comprising an alternating current source of substantially constant voltage, a plurality of rectifiers each of which is adapted to produce a direct current voltage when connected to said alternating current source, an input circuit including said source and each of said rectifiers connected in parallel relation with said source, a load circuit adapted to be operated at a predetermined voltage value, a plurality of switching devices, one for each of said rectifiers, voltage sensitive means responsive to variations in the said voltage of said load circuit to actuate said switches for varying the number of rectifiers effective in said load circuit, and a selector device acting in conjunction with said voltage sensitive means for determining in accordance with a random pattern which of the plurality of rectifiers are effective in the output circuit at any time.

5. The power supply system of claim 4, further characterized by the selector device comprising a stepping relay operable to render the voltage responsive means effective to act upon the separate rectifiers in sequence.

6. The power supply system of claim 5, further characterized by the stepping relay being operable in repeating cycles whereby the voltage responsive means is effective to act upon the separate rectifiers in cyclic sequence to render the rectifiers effective and ineffective in a random manner.

7. A rectifier power supply system comprising an alternating current source of substantially constant voltage, a plurality of rectifiers, each of which is adapted to provide a direct current voltage when connected to said alternating current source, an input circuit including said source and each of said rectifiers connected in parallel relation with said source, a load circuit adapted to be operated at a predetermined voltage value, a plurality of control relays, one for each rectifier, each of said relays being adapted to render a rectifier effective in said load circuit, a voltage responsive means operable in response to the voltage in said load circuit reaching a predetermined maximum to sequentially de-energize the control relays, thereby to render rectifiers ineffective so as to reduce the load circuit voltage, the control relays having normally open contacts in circuit with the voltage responsive means for rendering the said means ineffective to de-energize all of the control relays regardless of the voltage in the load circuit.

8. The power supply system of claim 7, further characterized by the voltage responsive means including a relay device, an energizing circuit for the relay device including a plurality of parallel current paths equal in number to the control relays, each current path including normally open contacts of two control relays, and each control relay having normally open contacts in two current paths, whereby the relay device is de-energized upon the de-energization of all but one of the control relays.

9. A rectifier power supply system comprising an alternating current source of substantially constant voltage, a plurality of rectifiers, each of which is adapted to produce a direct current voltage from said alternating current source, an input circuit including said source and each of said rectifiers connected in parallel relation, a load circuit adapted to be operated at a predetermined voltage value, a polarized relay connected to the load circuit and operative when the load circuit voltage is below a predetermined minimum to close a first set of contacts and when the load circuit voltage is above a predetermined maximum to close a second set of contacts, and a stepping relay actuated by closing either set of contacts to sequentially render the rectifiers effective or ineffective in the circuit according to which set of contacts is closed.

10. The power supply system of claim 9, further characterized by the stepping relay being arranged for cyclic actuation whereby the rectifiers are connected into and out of circuit in random order.

References Cited in the file of this patent

UNITED STATES PATENTS

| | | |
|---|---|---|
| 2,300,296 | Langabeer et al. | Oct. 27, 1942 |
| 2,322,955 | Perkins | Sept. 29, 1943 |